United States Patent [19]
Rieger, III

[11] Patent Number: 5,732,324
[45] Date of Patent: Mar. 24, 1998

[54] DIGITAL RADIO SYSTEM FOR RAPIDLY TRANSFERRING AN AUDIO PROGRAM TO A PASSING VEHICLE

[76] Inventor: Charles J. Rieger, III, 7417 River Falls Dr., Potomac, Md. 20854

[21] Appl. No.: 530,063

[22] Filed: Sep. 19, 1995

[51] Int. Cl.⁶ .................................................. H04H 1/00
[52] U.S. Cl. .......................... 455/3.1; 455/6.3; 455/4.2; 455/186.1
[58] Field of Search ................... 455/3.1, 4.2, 6.3, 455/185.1, 186.1

[56] References Cited

U.S. PATENT DOCUMENTS

| | | |
|---|---|---|
| 5,128,669 | 7/1992 | Dadds . |
| 5,193,214 | 3/1993 | Mardus . |
| 5,199,108 | 3/1993 | Morgan . |
| 5,276,909 | 1/1994 | Milner . |
| 5,289,184 | 2/1994 | Suzuki . |
| 5,406,626 | 4/1995 | Ryan . |
| 5,572,442 | 11/1996 | Schulhof ........................ 348/7 |

*Primary Examiner*—Sherrie Hsia

[57] ABSTRACT

An audio program of up to several minutes duration, together with identifying information, is transferred from a stationary low power radio transmitting unit to a receiving unit in a moving vehicle during a several second digitally encoded burst communication as the vehicle passes by. The receiving unit is capable of capturing, storing, and replaying many such audio programs during the vehicle's journey past numerous transmitters.

18 Claims, 5 Drawing Sheets

PDBR Receiving Unit Block Diagram

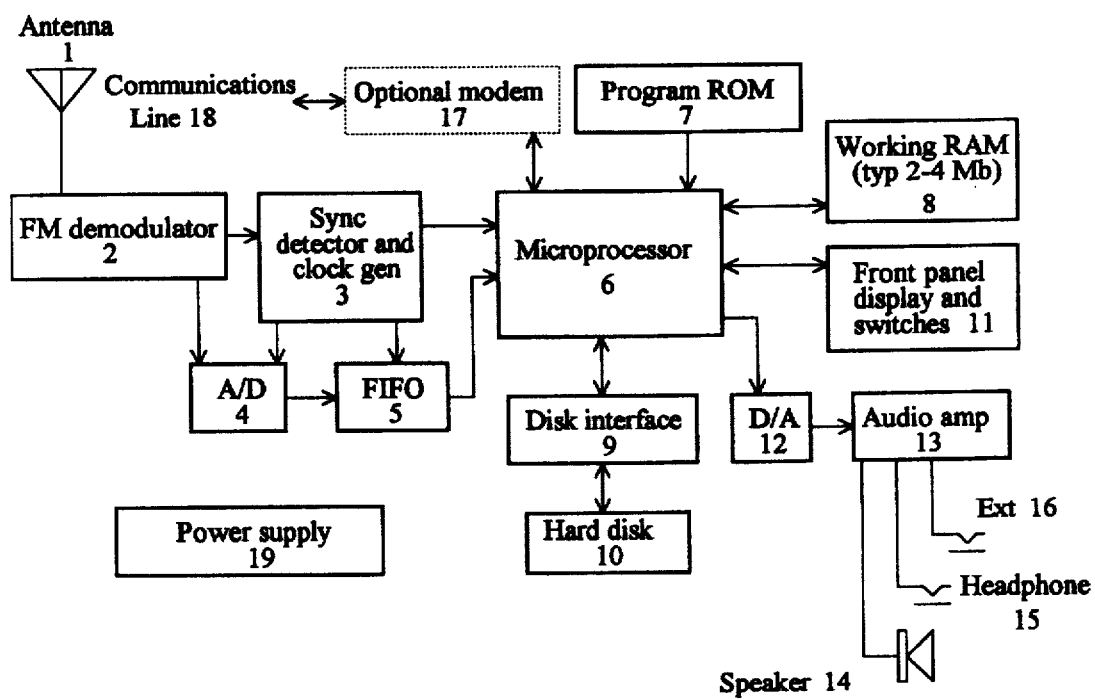
Figure 1. PDBR Receiving Unit Block Diagram

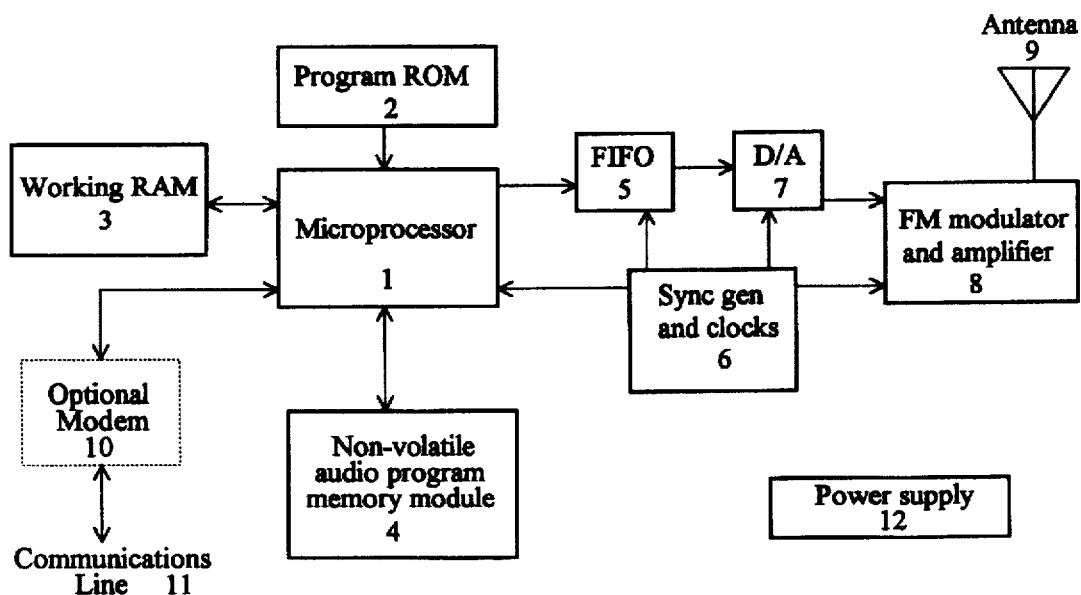
Figure 2. PDBR Transmitting Unit Block Diagram

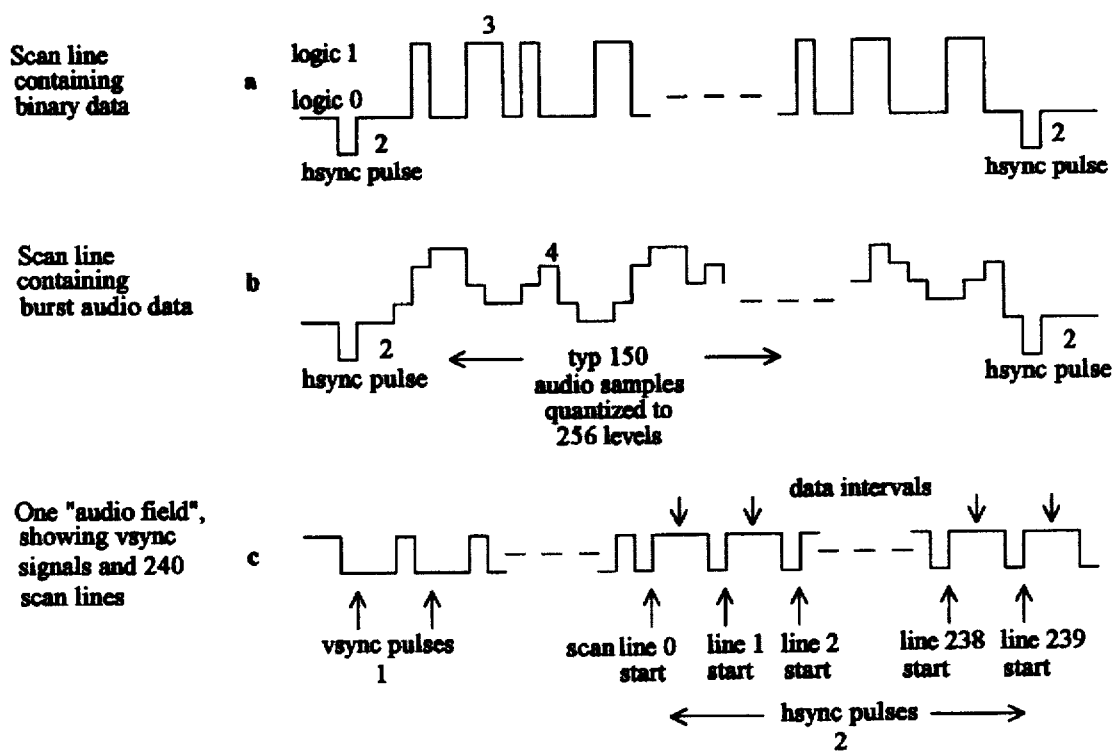
Figure 3. PDBR Signal Format

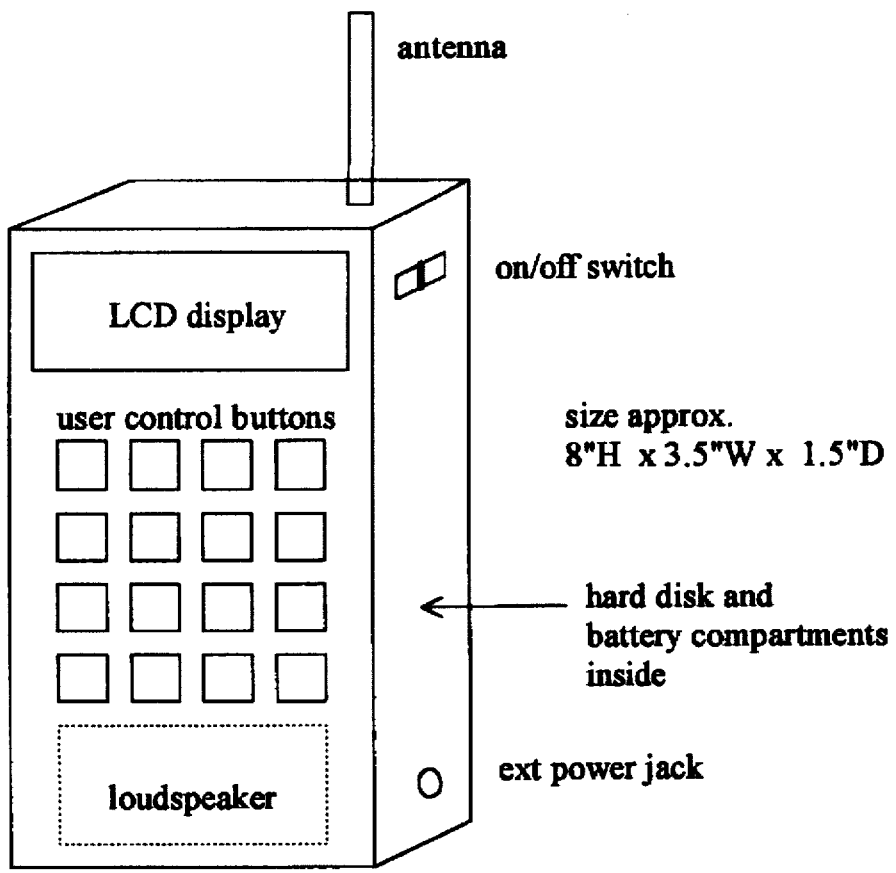
Figure 4. Typical PDBR Portable Receiving Unit Configuration

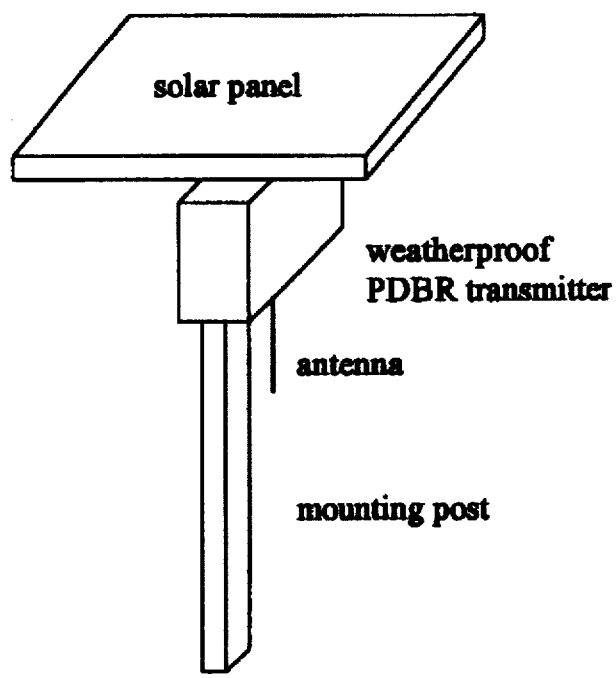
Figure 5. Typical Outdoor PDBR Transmitting Unit Configuration

DIGITAL RADIO SYSTEM FOR RAPIDLY TRANSFERRING AN AUDIO PROGRAM TO A PASSING VEHICLE

BACKGROUND OF THE INVENTION

1. Field of the Invention

This invention relates to the field of one-way digital audio communication by radio, and in particular to a method for rapidly transferring a several-minute audio program from a stationary, very low power transmitter situated near a roadway to a passing motor vehicle during the several seconds the vehicle is proximate to the transmitter as it passes by, and to specialized radio transmitting and receiving devices which are capable of implementing said transfer, the transmitter being capable of the repeated several-second transmission of the stored audio program, and the receiver being capable of capturing and saving one or more such audio programs to a mass digital storage medium, then later replaying said audio programs to an occupant of the vehicle upon request.

2. Related Art

Three areas of prior art are: radio traffic information systems, geographical information systems, and navigational information systems. This invention builds upon elements found in these various areas of prior art. However, its overall purpose, methods, implementation, and apparatus differ substantially from all known disclosures.

U.S. Pat. No. 5,199,108 to Morgan and Self, describes a radio traffic information system based on the repetitive broadcast by a low power AM transmitter of brief audio program materials for reception via standard AM radios in passing vehicles. In this system, the broadcast signal represents real time audio which can be received on a standard AM receiver. The signal carries audio information to the listener in real time, and only while the receiver is in range. Morgan and Self describe no notion of bursting an entire audio program to the vehicle within a several second interval at data rates much higher than real time audio. Likewise, there is no concept of capturing the audio program to mass digital storage for subsequent replay.

U.S. Pat. No. 5,128,669 to Dadds et al. presents a transponder system for communicating information to passing vehicles. This system is based on a combination of microwave and radio frequency communications wherein the microwave component establishes an address code which is subsequently used to identify the contents of the main information sent via the radio frequency component. This system is geared to the communication of specific information based on a transponder's address, and the key problem it addresses is how to identify a passing vehicle's address, then establish relevant communications with it based on this address. While related art, this system's design and purpose are entirely different from the invention at hand. There is also no disclosure relating to audio program material, techniques for transferring an audio program to the passing vehicle as a burst communication, or any apparatus which would be capable of capturing, storing, and replaying such a burst communication.

U.S. Pat. No. 5,289,184 to Suzuki describes a geographic and traffic system based on a radio beacon transmitter which sends map and traffic information to a passing vehicle, such information being processed and resulting in the display of a relevant map and traffic snarl data on a display screen in the vehicle. The radio beacons in Suzuki's system transmit geographic coordinate data which enables the vehicle's onboard system to recall and display a relevant map, and topical traffic information which can then be displayed on the map. The onboard system is geared toward the storage of map data, the selection and presentation of a map based on received coordinate data, and the graphical display of traffic information based on data received from the beacon. This system discloses no method or apparatus for rapidly transferring an audio program to the passing vehicle, and no method or apparatus for capturing, storing, and subsequently replaying such a program.

U.S. Pat. No. 5,193,214 to Mardus et at. describes another traffic information system based on beacons and a textual display in the receiving unit. U.S. Pat. No. 5,206,641 to Grant and Greenberg describes another traffic information system capable of reporting traffic conditions along a specified route. Neither of these patents relates to the transfer of audio program material in a burst communication.

U.S. Pat. No. 5,406,626 to Ryan describes a radio receiver for extracting encrypted textual information from FM sidebands, then playing it through a speech synthesizer on demand from the user. Ryan's system is designed to receive and collect encrypted textual information from a regional FM broadcast signal, then present it on demand from a user as synthesized speech. There is no disclosure relating to the rapid transfer of an audio program of unrestricted contents to a vehicle as it passes by a very low power transmitter, nor to a low power transmitter unit or receiving apparatus capable of affecting such a transfer.

U.S. Pat. No. 5,276,909 to Miller et at. describes another traffic information system capable of broadcasting numerous audio segments, each of which is relevant to a particular geographic area, and each separated by marker tones and coded duration information identifying the region of relevance for the audio segment. Miller et al.'s system is designed for the regional deployment of user-selectable traffic information, and is not based on very low power transmitters specific to a particular site. Also, there is no disclosure relating to the burst transmission, capture, storage, and subsequent replay of audio programs as a vehicle passes by a stationary, low power transmitter.

SUMMARY OF THE INVENTION

It is a first objective of the invention to provide a method for rapidly transferring an audio program of moderate length (several minutes) from a stationary, very low power radio transmitter situated near a roadway to an occupant of a moving vehicle, in the form of a digitally encoded burst transmission during the several seconds in which the moving vehicle is proximate to the transmitter.

It is a second objective of the invention to provide an inexpensive portable or mobile radio receiving unit which is capable of (1) detecting the presence of said burst radio transmission, (2) demodulating and capturing its digitally encoded audio program content to a digital storage medium, (3) saving and indexing one or more such captured audio programs to a mass digital storage medium, and (4) replaying any such captured program upon user request.

It is a third objective of the invention to provide an inexpensive, very low power radio transmitter capable of (1) holding a moderate length audio program in a digital storage medium, (2) repeatedly broadcasting said program as a several-second digitally encoded burst signal, (3) accepting updated audio program material via one or more methods, e.g., manual replacement of the digital media, remote replacement over telecommunications lines, or "proximate" replacement using the same digital burst method via its own built-in receiver, and (4) withstanding the elements of weather in an outdoor mounting location.

PURPOSE OF THE INVENTION

This invention, Proximate Digital Burst Radio (PDBR), is a system for delivering an audio program of up to several minutes' duration, whose content is relevant to a particular geographic location, to the occupants of a moving vehicle as the vehicle travels past the location. Potentially many thousands of PDBR transmitters could ultimately be set up by individuals or organizations around city, suburban, and rural roadways across the country. As motorists drive past PDBR transmitters, they collect audio programs for immediate or later replay. The contents of the audio programs are relevant to the site at which the programs are broadcast.

A PDBR system would permit the delivery of information at its "point of relevance" to receiving units in vehicles passing near the point. In contrast to standard broadcast radio, PDBR would be capable of delivering specific information to only those individuals who are in a position to use or be interested in the information, rather than to a population at large. Because of their extremely low power, PDBR transmitters could be spaced very closely in an urban setting, with no attendant interference problems.

PDBR program contents would be arbitrary audio productions of voice, music, or any other relevant materials. PDBR transmitters could be set up and maintained by government agencies, corporations, small businesses, communities, neighborhoods, or even individuals. Example topics of a PDBR program are:

historical or topical information about a site or location,
availability of goods or services,
advertising or directions to a business or attraction,
entertainment relevant to a particular time and place,
temporal traffic information,
news bulletins relevant to a specific street corner or city block.

Three representative societal uses of a PDBR system are:

To educate people as they drive. Much about a hill, a forest, a bridge, a village, a river, a building, a city goes unnoticed. Potentially interesting or useful information underlies almost everything we drive by, yet we seldom find out about it. PDBR would give motorists access to a wide variety of useful or interesting information in an appropriate and unobtrusive way.

To inform people of goods, services, and events. Chambers of commerce could describe their town; individual businesses could announce their presence and advertize their services and products. Corporations could describe who they are and what they do. Communities could describe their activities, welcome new residents, and post topical information. Even an individual could post announcements via a PDBR transmitter affixed, e.g., to the mailbox or the outside of the house.

To alert motorists to driving conditions, changes in driving patterns, or simply to give directions of some sort. Using PDBR, lost dog and stolen car announcements could be delivered to the city block where they mattered.

This invention is a digital audio analog of the hook and mail pouch technique once used to transfer mail to a moving train.

BRIEF DESCRIPTION OF THE DRAWINGS

FIGS. 1 and 2 are block diagrams of a PDBR receiving unit and transmitting unit, respectively.

FIG. 3 illustrates a PDBR signal format based on a standard monochrome TV signal format.

FIGS. 4 and 5 are example mechanical configurations for a PDBR receiver and transmitter unit, respectively.

GENERAL IMPLEMENTATION

A PDBR system consists of: (1) a very low power, stationary FM radio transmitter with a typical range of no more than several hundred feet, and (2) a portable or mobile FM radio receiver capable of:

detecting and receiving the transmitted signal as the vehicle passes by, demodulating and decoding the digital audio program contents and related identifying information via sync detection and A/D sampling circuitry, then saving it to a digital storage medium, alerting the occupants of the vehicle to the program's presence and displaying information about the received program, playing the program on demand, deleting programs no longer needed.

Being digitally encoded audio, and broadcast at FM frequencies, an entire program of several minutes' duration can be transmitted as a several second burst transmission, which the PDBR transmitter repeatedly broadcasts with appropriate synchronization signals. The program is captured and stored by the receiving unit during the moments the vehicle passes by, and is stored for subsequent playback at the occupant's discretion.

The PDBR receiving unit has the capacity to store many such audio programs (up to several hours' worth), "collecting" them as the vehicle passes by potentially many PDBR transmitters during its journey. A short digitally encoded preamble containing the transmitter's ID, data coding format information, a brief textual description of the program's contents, and the program's date of creation are also encoded in the transmission, for presentation via a text display panel on the receiving unit. When saved to the receiver's hard disk, this preamble information also enables the receiving unit to filter out programs recognized as already having been captured, to minimize the annoyance of recapturing the same programs over and over again on frequently traveled stretches of road.

In a preferred embodiment, the system is implemented using a transmitter technology similar or identical to standard, very low power TV transmitters. The standard U.S. TV broadcast format is 60 fields per second, each field consisting of approximately 240 visible scan lines, each line containing a continuously changing analog signal of frequency up to approximately 3 MHz, which, if sampled digitally, contains the equivalent of something on the order of 150 discrete pixels. Thinking of such a signal as a collection of pixels rather than a continuously varying analog signal, the net transmission data rate in this setting is therefore approximately 72,000 pixels per frame, or approximately 2 million pixels per second.

If, instead of representing video data, the signal represented a digitally synthesized audio waveform, then approximately 2 million audio samples can be transmitted and recovered per second. Other types of supplemental data, such as audio sample rate information for playback, transmitter ID, program title and date, and program origin can also be encoded at the beginning of the signal using any of a variety of binary coding conventions.

The decoding and capture of such a signal is performed by circuitry similar or identical to that of a conventional video frame grabber, then stored to a digital medium in the PDBR receiver. Instead of capturing pixels, however, the digitization process captures audio samples which are intended for replay at a much lower data rate.

At 55 MPH a vehicle travels approximately 162 feet in two seconds. A transmitter positioned within 200 feet of the road's center, for example, and having a 300 foot broadcast radius can easily transmit the 2 million audio samples in a repetitive one or two second burst transmission to any passing vehicle.

"Radio quality" audio is commonly encoded digitally as 11,250 8-bit samples per second, per channel. In the one second of transmission time, therefore, a monaural audio program of approximately 3 minutes in duration can be communicated to the passing vehicle. Higher quality audio, two-channel stereo, or a longer monaural program can clearly be sent if the transmission time is extended to several seconds, still quite reasonable for a passing vehicle to capture.

The owner of a PDBR transmitter can periodically change program contents by manually changing its non-volatile memory module, or via a telecommunications channel (modem) link where practical, or by a PDBR "upload" method.

PDBR RECEIVER ARCHITECTURE

In the preferred embodiment, a PDBR receiver unit (FIG. 1) consists of a standard FM TV receiver front end (or very similar circuitry), tuned to a distinct frequency which is not in conflict with existing broadcast or cellular communications bands. Demodulated output is fed to a microprocessor-controlled digital sampler (e.g., frame grabber) which detects and locks onto the synchronization signals, then quantizes, captures, and assembles the contents of each frame into a continuous stream of data bytes which constitute the digitally encoded audio program, including any preamble and other control information. The microprocessor services the incoming stream, possibly running an error detection/correction algorithm over it to minimize any errors, particularly in the preamble, and stores the program to a RAM holding buffer. From there the program can be played through the receiver's D/A audio system and/or saved to mass storage, e.g., a hard disk, for later recall and replay.

After capturing the transmission, the receiver identifies and presents relevant information to the user on its small built-in text display panel, and optionally emits a brief audio alarm to attract attention to the newly arrived program. By pushing buttons on the receiver, the user can request that the program be played immediately, stored for later recall, or discarded. If not attended to before another program arrived, the unit automatically saves the program and marks it as not yet having been acted upon.

To avoid the nuisance of constantly capturing the same program over and over on frequently traveled stretches of road, the PDBR receiver also maintains a potentially large directory of previously-received program information, and, upon user request, is capable of filtering out (i.e., not recapturing) programs already captured and stored.

The receiving unit has an integral hard disk of sufficient capacity to store many received programs. An inexpensive 250 megabyte hard disk, for example, can hold more than 100 3-minute "radio quality" monaural programs (a total of 5 hours), together with a relatively large index of captured program ID's and dates. Front panel controls on the PDBR receiving unit enable the user to manage the contents of the disk, e.g., browse, play, and delete stored programs. The receiving unit can also alert the user when disk storage is becoming low.

Depending on its features and storage capacity, a PDBR receiver can potentially be manufactured and sold at about the same cost as a good quality car stereo. In one embodiment, a PDBR receiver could be fully integrated with, or even replace, the standard car radio. It could also be designed as a hand-held portable unit similar in form factor to, e.g., a portable audio CD player.

Detailed PDBR Receiver Description

Referring to FIG. 1, antenna (1) picks up incoming signal and FM demodulator (2) demodulates it. Demodulated signal is fed to sync detector (3) which separates and locks onto synchronization signals, generating appropriate clocking signals and "signal available" signal to microprocessor (6). Clocking and control signals are fed to A/D converter (4) and FIFO (5), which digitize and buffer the incoming audio samples from each scan line. Reading appropriate control signals from the sync detector and FIFO, the microprocessor reads the incoming data stream from the FIFO and stores it to working RAM (8), running software from program ROM (7). After reception, the microprocessor saves the received program and related index information from working RAM to hard disk (10) via disk interface (9), then alerts user by updating appropriate controls on front panel (11). The microprocessor senses user requests via switches on front panel and, on demand, plays any captured program by sending the data stream through D/A converter (12) and audio amplifier (13) at the appropriate audio sample rate. User hears replayed program via integral speaker (14), headphone jack (15), or external speaker system jack (16). Being event driven, the microprocessor is capable of simultaneously capturing a new program while replaying a saved program. Optional modem (17) allows the receiver to download any captured program to an external communications line (18), which could, for example, be connected to a matching PDBR transmitting unit for the purposes of changing the transmitter's program contents. Power supply (19), which is battery and/or AC converter based, provides low voltage DC power to all components.

PDBR TRANSMITTER ARCHITECTURE

A PDBR transmitter (FIG. 2) is typically mounted outdoors in a weather-resistant enclosure near a road, and is powered from a solar, and/or battery, and/or AC energy source. It is microprocessor based, and transmits its signal by repetitively reading its digitally encoded audio program's contents from a removable non-volatile digital storage medium (EPROM, flash RAM, etc.) and using this digitally stored information to modulate the transmitted signal.

The transmitter unit's program memory can be updated periodically by a site visit. The transmitter can also have an optional digital communication link (e.g., modem) for receiving new program material from a remote location, obviating the need for site visits. In a more advanced configuration, the transmitter unit has its own built-in PDBR receiver, which is capable of receiving and uploading new program materials from a passing "drop off" vehicle equiped with a PDBR transmitter that has appropriate authorization, e.g., a password embedded in its firmware which would be sent as part of the signal.

The transmitter's antenna coverage can either be directional or non-directional, depending on the intended reception area. All PDBR transmitters could be designed to operate on the same frequency, since interference would be implicitly controlled by appropriate site spacing. In a more advanced system, there might be several PDBR frequencies, perhaps relating to program categories, e.g., informational, advertizing, traffic-related, etc. If this were the case, a PDBR receiver could optionally include a frequency scanning front end which would enable it to detect and capture a program from any of the possible PDBR frequencies.

Depending on the configuration and power source, a typical PDBR transmitter can potentially be deployed at a cost of not more than several hundred dollars. As an individual transmitter, it would probably need no FCC certification, assuming its frequency were not in conflict with any existing band. However, as a "system", in which many thousands of PCDR transmitters might eventually be deployed, some sort of centralized licensing or certification authority might be appropriate.

Detailed PDBR Transmitter Description

Referring to FIG. 2, sync generator and docking circuitry (6) generate repetitive synchronization signals and related clocks. Microprocessor (1), running from program ROM (2) and working RAM (3), responds to sync clocking information, reads stored audio program data from nonvolatile memory module (4), and assembles it into a data stream which it feeds into output FIFO (5). Clocking signals move the data from the FIFO through D/A converter (7) into FM modulator and amplifier (8) where it is mixed with the synchronization signals, modulated, and broadcast through antenna (9). Optional modem (10) is capable of uploading new program materials to nonvolatile RAM via communications line (11) which can be driven from a remote site or from a companion PDBR receiving unit capable of accepting new program materials from a passing "dropoff" vehicle. Power supply (12), which is battery and/or solar and/or AC converter based, provides low voltage DC power to all components.

Signal Format Description

In the preferred embodiment the PDBR signal, illustrated in FIG. 3, is based on a conventional monochrome TV format. In this format, information is segmented into 60 fields per second, each field consisting of approximately 240 useable scan lines of data. As shown in FIG. 3c, fields are delimited by vertical sync pulses (1), and lines within each field by hsync pulses(2), all pulses spaced at approximately 63.4 microsecond intervals. FIG. 3a illustrates how binary data for the program header are communicated in this scheme, with binary 0's and 1's being sent on a fixed time schedule across each scan line, e.g., 150 samples per second (3). The first line of each field typically contains binary data describing the field's sequence number within the transmission. Lines 1–239 of the first field of the program typically contain the binary information representing the program's preamble (up to approximately 4,000 bytes). The program's audio contents are sent on lines 1–239 of each field after the first field in the transmission. On these lines, each audio sample (4) is sent as a 256 level quantized signal on a fixed schedule across the line, as shown in FIG. 3b. The PDBR receiving unit samples all scan lines on a fixed sampling schedule (e.g., 150 samples per scan line) so that each sample of binary or quantized audio is captured at close to its midpoint in time.

EXAMPLE RECEIVER AND TRANSMITTER MECHANICAL FORMATS

FIG. 4 illustrates a representative mechanical format for a portable PDBR receiving unit. This unit mechanically resembles a hand-held radio transceiver, and would typically be carried in the user's automobile. Its antenna would be capable of receiving PDBR signals, which would be internally processed and stored as a received audio program on the unit's internal hard disk for subsequent replay. The unit's LCD would display information about particular received programs and overall system status, e.g., remaining hard disk space number of saved programs, and so forth. The front panel control buttons would permit the user to carry out such functions as arming/disarming the system for program capture, selecting and replaying captured programs over the unit's internal loudspeaker, deleting captured programs, and so forth. The on/off switch and external power jack would serve their traditional functions of turning the unit on and off, and augmenting the unit's batteries via an external power source, respectively.

FIG. 5 illustrates a typical outdoor PDBR transmitting unit based on solar and battery power. This free-standing unit would typically be placed alongside a roadway, and would be powered via its solar panel which would keep its internal batteries recharged. The unit's PDBR transmitter is enclosed in a weatherproof container, from which the PDBR antenna projects. The entire unit would be mounted on a post in the ground, or could be attached to some other existing structure such as an overpass, telephone pole, or light pole.

I claim:

1. A one-way radio communication system for rapidly transferring an audio program as a digitally encoded burst transmission of up to several seconds' duration from a fixed geographic point to a moving vehicle as the vehicle passes nearby the point, comprising:

a very low power radio or TV frequency transmitting unit having means for holding a digitally encoded audio program in a non-volatile digital storage medium, repetitively broadcasting said program at an audio sample data rate substantially higher than real time as a burst transmission of up to several seconds in duration, said transmission also containing appropriate synchronization and program identification signals; and a radio receiving unit having means for detecting, receiving, and demodulating said burst transmission, means for extracting said transmission's digitally encoded audio program and related program identification information, means for identifying the date and time of reception, means for storing one or more said audio programs and said program identification information to a digital storage medium, means for signalling the presence of said audio program to a user, and means for playing any such stored audio program from said digital storage medium via integral D/A circuitry connected to an internal or external speaker system, on demand from a user.

2. A system as claimed in claim 1 wherein said transmitting unit and said receiving unit employ a standard monochrome TV broadcast signal, wherein said audio program contents and identifying information are encoded and transmitted during said broadcast signal's visible scan line times, and wherein said broadcast signal's vertical and horizontal synchronization pulses are used to synchronize the transfer of said audio program and said program identification information between the transmitting and receiving units.

3. A system as claimed in claim 1 wherein the receiving unit has an integral ASCII display panel and means for displaying receiver system status and audio program information stored in the receiving unit's digital storage medium.

4. A system as claimed in claim 1 wherein the receiving unit has an integral analog or digital audio tape cassette unit and means for offloading any stored audio program from the receiving unit's digital storage to analog or digital tape.

5. A system as claimed in claim 1 wherein the receiving unit has the means for storing received program identification information to the digital storage medium, a means for automatically recognizing a received program as one which has already been marked for rejection based on said stored program information, and a means for automatically rejecting or discarding the received program based on said recognition.

6. A system as claimed in claim 1 wherein the receiving unit has user controls for: (1) programming the unit concerning the types of audio programs to be captured and saved, based on criteria present in the programs' information headers, (2) enabling/disabling an audible alarm which signals the presence of a newly received audio program, (3) browsing the index of received program information, and for playing or deleting any program, and (4) enabling/disabling the automatic presentation of a brief(e.g., 10 second) preview of an audio program after said program's reception.

7. A system as claimed in claim 1 wherein the receiving unit is a hand-held, battery powered, portable device.

8. A system as claimed in claim 1 wherein the receiving unit is installable in a motor vehicle.

9. A system as claimed in claim 1 wherein the receiving unit is integrated with standard car radio functions, including an AM/FM receiver, tape cassette player, and possibly an audio CD player.

10. A system as claimed in claim 1 wherein the transmitting unit has means for accepting new audio program materials by replacing a plug-in, read-only digital storage module.

11. A system as claimed in claim 1 wherein the transmitting unit has means for accepting new audio program materials via a built-in modem subsystem which receives new program materials via a telecommunications link and stores said new program materials in the non-volatile digital storage medium.

12. A system as claimed in claim 1 wherein the transmitting unit has means for accepting new audio program materials via a built-in receiver unit which is capable of receiving the materials from a moving vehicle as the vehicle passes by and storing them in the non-volatile digital storage medium.

13. A system as claimed in claim 1 wherein the transmitting unit is AC powered.

14. A system as claimed in claim 1 wherein the transmitting unit is battery powered.

15. A system as claimed in claim 1 wherein the transmitting unit is solar powered with an integral battery.

16. A system as claimed in claim 1 wherein the receiving unit includes a frequency scanning front end, and is capable of receiving such burst transmissions from several distinct transmitting frequencies.

17. A system as claimed in claim 1 wherein the receiving unit's integral mass digital storage medium is a hard disk drive.

18. A system as claimed in claim 1 wherein the receiving unit's integral mass digital storage medium is a digital tape cassette unit.

* * * * *